Figures 1, 2:
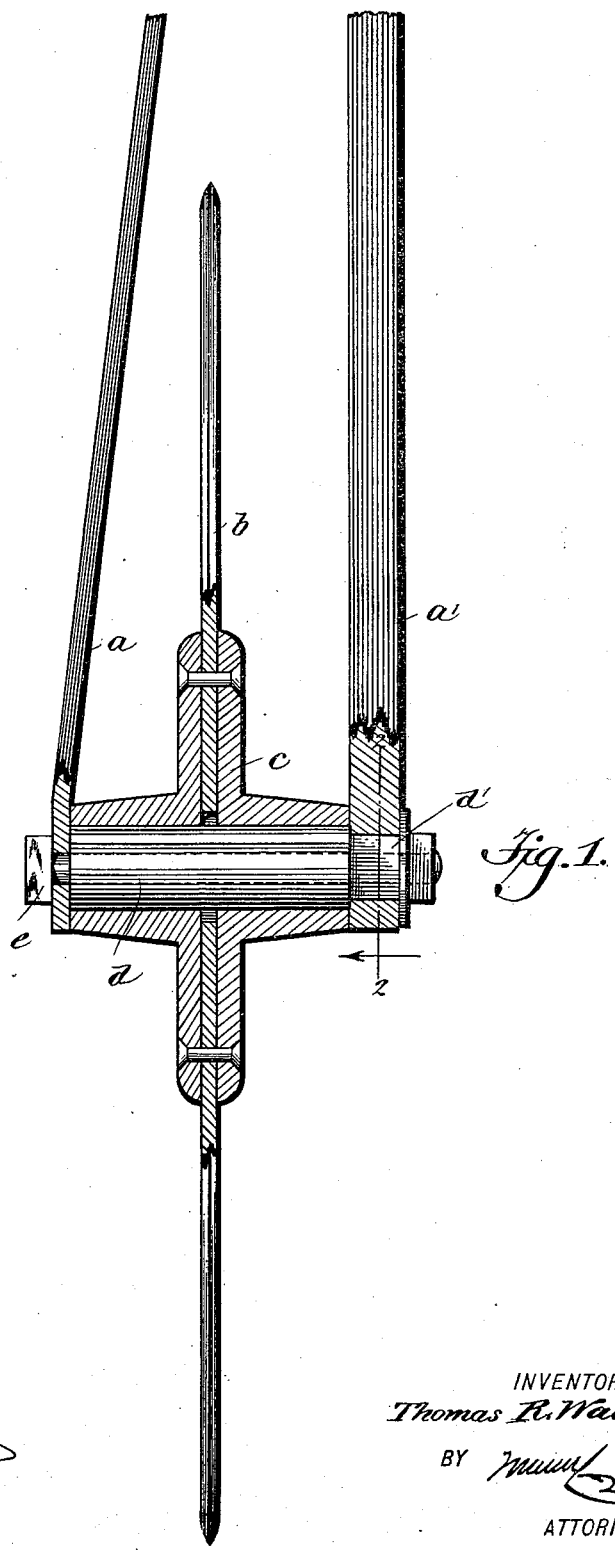

No. 714,070.　　　　　　　　　　　　　　　　　Patented Nov. 18, 1902.
T. R. WALLIS.
COLTER BEARING.
(Application filed Feb. 10, 1902.)

(No Model.)

WITNESSES:

INVENTOR
Thomas R. Wallis
BY
ATTORNEYS

UNITED STATES PATENT OFFICE.

THOMAS RILEY WALLIS, OF DYERSBURG, TENNESSEE.

COLTER-BEARING.

SPECIFICATION forming part of Letters Patent No. 714,070, dated November 18, 1902.

Application filed February 10, 1902. Serial No. 93,347. (No model.)

*To all whom it may concern:*

Be it known that I, THOMAS RILEY WALLIS, a citizen of the United States, and a resident of Dyersburg, in the county of Dyer and State of Tennessee, have invented a new and Improved Colter-Bearing, of which the following is a full, clear, and exact description.

The object of this invention is to provide a firm and true bearing for the colter, on which bearing the colter may be mounted to turn freely with relatively little friction.

This specification is a specific description of one form of the invention, while the claim is a definition of the actual scope thereof.

Reference is to be had to the accompanying drawings, forming a part of this specification, in which similar characters of reference indicate corresponding parts in both views.

Figure 1 is a sectional view of the invention, and Fig. 2 is a detail section thereof on the line 2 2 of Fig. 1.

$a$ and $a'$ indicate the arms of the plow, which arms carry the colter after the usual custom.

The colter comprises a disk $b$ and a hub $c$, formed of two sections fastened together, one on each side of the disk.

The bearing comprises a thimble $d$ and a bolt $e$. The bolt passes through the thimble and through the arms $a$ and $a'$ and is fastened against the outer faces of the arms, drawing them firmly toward each other. The thimble sets between the arms and has its ends held firmly against the arms by the action of the bolt. One end of the thimble is squared, (see $d'$ in the drawings,) and this square end fits snugly in a corresponding opening in the adjacent arm $a'$. The hub of the colter turns loosely on the thimble. It will be seen that by these means the thimble is held firmly against all movement and that it furnishes a secure bearing for the colter.

Various changes in the form and details of my invention may be resorted to at will without departing from the spirit of my invention. Hence I consider myself entitled to all forms of the invention as may lie within the intent of my claim.

Having thus described my invention, I claim as new and desire to secure by Letters Patent—

The combination with the supporting-arms, one of which is formed with an angular opening therein extending transversely through it, of a thimble extending between the arms, the thimble having at one end a reduced angular portion fitting in the angular opening of the said arm and extending through to the outer side thereof, a tie-bolt extending through the thimble and holding the arms firmly engaged with the ends of the same, the tie-rod including a fastening means bearing against the end of said reduced portion of the thimble and the outer face of the adjacent arm, and a colter mounted to turn on the thimble.

In testimony whereof I have signed my name to this specification in the presence of two subscribing witnesses.

THOMAS RILEY WALLIS.

Witnesses:
W. THOS. ROSE,
A. WORTHINGTON.